US010661676B2

(12) United States Patent
Takatsuka et al.

(10) Patent No.: US 10,661,676 B2
(45) Date of Patent: May 26, 2020

(54) GUIDE DEVICE, GUIDE SYSTEM, AND GUIDE METHOD

(71) Applicant: OMRON CORPORATION, Kyoto-shi, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON Corporation, Kyoto-shi (JP)

( * ) Notice: Subject to any disclaimer, the term of this patent is extended or adjusted under 35 U.S.C. 154(b) by 124 days.

(21) Appl. No.: 15/757,667

(22) PCT Filed: Nov. 2, 2016

(86) PCT No.: PCT/JP2016/082568
§ 371 (c)(1),
(2) Date: Mar. 6, 2018

(87) PCT Pub. No.: WO2017/086163
PCT Pub. Date: May 26, 2017

(65) Prior Publication Data
US 2019/0023138 A1    Jan. 24, 2019

(30) Foreign Application Priority Data
Nov. 17, 2015  (JP) ................................. 2015-224402

(51) Int. Cl.
*G06Q 50/00*    (2012.01)
*B60L 53/80*    (2019.01)
(Continued)

(52) U.S. Cl.
CPC ............... *B60L 53/80* (2019.02); *B60L 53/53* (2019.02); *B60L 53/65* (2019.02); *B60L 53/67* (2019.02);
(Continued)

(58) Field of Classification Search
CPC ............... G06Q 50/00; H02J 7/04; B60S 5/02
(Continued)

(56) References Cited

U.S. PATENT DOCUMENTS 9,103,686 B2    8/2015 Pettersson
2010/0094496 A1*  4/2010 Hershkovitz ............. B60L 3/12
701/22
(Continued)

FOREIGN PATENT DOCUMENTS

CN    102884401 A    1/2013
JP    2006-331405 A    12/2006
(Continued)

OTHER PUBLICATIONS

An English translation of the International Search Report of PCT/JP2016/082568 dated Jan. 24, 2017.
(Continued)

*Primary Examiner* — Tan Q Nguyen
(74) *Attorney, Agent, or Firm* — Metrolex IP Law Group, PLLC

(57) ABSTRACT

A guide device (40) comprises a station battery information acquisition component (41), a vehicle battery information acquisition component (43), and a guide component (46). The station battery information acquisition component (41) is configured to acquire station battery information about a plurality of batteries (10) that are being charged at a charging station (60) in which are installed one or more charging devices configured to charge the batteries (10). The vehicle battery information acquisition component (43) is configured to acquire vehicle battery information about the batteries (10) respectively connected to a plurality of vehicles (20). The guide component (46) is configured to guide a specific vehicle (20) to a specific charging station on the basis of the station battery information acquired by the station battery information acquisition component (41) and the vehicle battery information acquired by the vehicle battery information acquisition component (43).

11 Claims, 8 Drawing Sheets

(51) Int. Cl.

| | |
|---|---|
| B62M 6/90 | (2010.01) |
| G01C 21/34 | (2006.01) |
| G06Q 50/06 | (2012.01) |
| H02J 7/00 | (2006.01) |
| G06Q 10/04 | (2012.01) |
| B60L 53/65 | (2019.01) |
| B60L 53/67 | (2019.01) |
| G06Q 50/30 | (2012.01) |
| G06Q 30/06 | (2012.01) |
| B60L 53/68 | (2019.01) |
| B60L 53/53 | (2019.01) |
| G01C 21/20 | (2006.01) |
| G05B 19/042 | (2006.01) |
| H02J 7/04 | (2006.01) |
| B60K 1/04 | (2019.01) |
| B60K 6/28 | (2007.10) |

(52) U.S. Cl.
CPC .............. *B60L 53/68* (2019.02); *B62M 6/90* (2013.01); *G01C 21/20* (2013.01); *G01C 21/3453* (2013.01); *G01C 21/3469* (2013.01); *G05B 19/042* (2013.01); *G06Q 10/047* (2013.01); *G06Q 30/0631* (2013.01); *G06Q 30/0645* (2013.01); *G06Q 50/06* (2013.01); *G06Q 50/30* (2013.01); *H02J 7/0013* (2013.01); *H02J 7/0014* (2013.01); *H02J 7/0027* (2013.01); *B60K 1/04* (2013.01); *B60K 6/28* (2013.01); *B60L 2200/12* (2013.01); *B60L 2240/72* (2013.01); *B60L 2250/16* (2013.01); *B60L 2260/52* (2013.01); *B60Y 2200/91* (2013.01); *B60Y 2200/92* (2013.01); *G05B 2219/2639* (2013.01); *Y02T 10/7055* (2013.01)

(58) Field of Classification Search
USPC .......................................................... 701/22
See application file for complete search history.

(56) References Cited

U.S. PATENT DOCUMENTS

| | | | |
|---|---|---|---|
| 2010/0106401 | A1 | 4/2010 | Naito et al. |
| 2010/0230188 | A1* | 9/2010 | Nguyen .................... B60S 5/06 180/65.1 |
| 2012/0109519 | A1* | 5/2012 | Uyeki ...................... B60L 7/14 701/439 |
| 2012/0158229 | A1 | 6/2012 | Schaefer |
| 2012/0303397 | A1* | 11/2012 | Prosser .................... B60L 53/57 705/7.12 |
| 2013/0046457 | A1 | 2/2013 | Pettersson |
| 2015/0039391 | A1 | 2/2015 | Hershkovitz et al. |

FOREIGN PATENT DOCUMENTS

| | | |
|---|---|---|
| JP | 2007-182310 A | 7/2007 |
| JP | 2010-107203 A | 5/2010 |
| JP | 2011-197932 A | 10/2011 |
| JP | 2014-524618 A | 9/2014 |
| TW | I477745 B | 3/2015 |
| WO | 2010/005052 A2 | 1/2010 |
| WO | 2015/001930 A1 | 1/2015 |

OTHER PUBLICATIONS

An English translation of the Written Opinion of PCT/JP2016/082568 dated Jan. 24, 2017.
The Taiwanese Office Action dated Jan. 24, 2018 in the counterpart Taiwanese patent application.
The extended European search report (EESR) dated Nov. 6, 2018 in a counterpart European patent application.

* cited by examiner

| Charging station | StA | StB |
|---|---|---|
| Housed batteries (number) | 140 | 28 |
| First threshold value (number) | 80 | 16 |
| Second threshold value (number) | 120 | 24 |
| Target number | 100 | 20 |

FIG. 7

| Charging station | StA | StB |
|---|---|---|
| Third threshold value (wh) | 800wh | 1200wh |
| Fourth threshold value (wh) | 1200wh | 1600wh |
| Target average capacity (wh) | 1000wh | 1400wh |

FIG. 8

GUIDE DEVICE, GUIDE SYSTEM, AND GUIDE METHOD

FIELD

The present invention relates to a guide device, a guide system, and a guide method.

BACKGROUND

Recent years have seen systems constructed in which battery packs installed in a vehicle (an example of a power consumption element) such as an electric motorcycle or an electric bicycle are used and then exchanged at a charging device where charged batteries are available.

For example, Patent Literature 1 discloses a secondary battery supply system in which various kinds of information, such as whether or not supply is possible in a secondary battery supply system, the number of batteries that can be supplied, and the supply price, is acquired and charging facility information is displayed on a display component in order to exchange secondary batteries that have been discharged in an electric vehicle.

CITATION LIST

Patent Literature

Patent Literature 1: JP-A 2006-331405

SUMMARY

However, the following problems are encountered with the secondary battery supply system shown in Patent Literature 1.

With above the secondary battery supply system, the user can select the desired charging facility from information about his own vehicle and information about a plurality of charging facilities.

With such a system, however, if a given business owner, such as a taxi company, owns a plurality of vehicles and a plurality of charging stations, a vehicle cannot be guided to one of those charging stations.

It is an object of the present invention to provide a guide device, a guide system, and a guide method with which a power consumption element can be guided to a charging station, for a plurality of power consumption elements and a plurality of charging stations.

Solution to Problem

The guide device pertaining to the first invention comprises a first battery information acquisition component, a second battery information acquisition component, and a guide component. The first battery information acquisition component acquires first information related to a plurality of batteries being charged at a charging station in which are installed one or more charging devices capable of charging the batteries. The second battery information acquisition component acquires second information related to the batteries respectively connected to a plurality of power consumption elements. The guide component guides a specific power consumption element to a specific charging station on the basis of the first information acquired by the first battery information acquisition component and the second information acquired by the second battery information acquisition component.

Thus acquiring information related to batteries being charged from a plurality of charging stations and acquiring information related to the connected batteries from a plurality of vehicles allows a power consumption element to be guided to a charging station on the basis of this information.

This avoids a concentration of load on a specific charging station, for example.

The guide device pertaining to the second invention is the guide device pertaining to the first invention, wherein the first information includes information about the number of the batteries being charged at the charging station. The guide component guides the power consumption elements so as to equalize the number of the batteries at a plurality of the charging stations.

Consequently, the number of batteries at a plurality of charging stations can be equalized, and concentration of the load on a specific charging station can be avoided.

The guide device pertaining to the third invention is the guide device pertaining to the first invention, wherein the first information includes information about the average capacity of the batteries being charged at the charging station. The guide component guides the power consumption elements so as to equalize the average capacity of the batteries at a plurality of the charging stations.

Consequently, the average capacity of the batteries at a plurality of charging stations can be equalized, and concentration of the load on a specific charging station can be avoided.

The guide device pertaining to the fourth invention is the guide device pertaining to the first invention, wherein the first information includes information about the number of batteries being charged at a charging station. A target number is set for each of the plurality of charging stations. The guide component guides a power consumption element so that the number of batteries being charged at each of the charging stations falls within a specific range that uses the target number as a reference.

This allows a power consumption element to be guided so as to approach a different target value for each charging station, at a plurality of charging stations. For example, it is preferable to set the target number higher for a charging station located in the center of a city than for a charging station located on the outskirts of the city, so power consumption elements can be guided so that the appropriate number of batteries for each locale will be on charge at the charging stations.

The guide device pertaining to the fifth invention is the guide device pertaining to the first invention, wherein the first information includes information about the average capacity of the batteries being charged at the charging station. A target average capacity is set for each of the plurality of charging stations. The guide component guides a power consumption element so that the average capacity of the batteries being charged at each of the charging stations falls within a specific range that uses the target average capacity as a reference.

Consequently, power consumption elements can be guided so as to approach a different target value for each charging station, at a plurality of charging stations. For example, since the travel distance is farther in the suburbs than in urban centers, the target average capacity is preferably set higher for charging stations located in the suburbs than for charging stations located in an urban center, so power consumption elements can be guided so that the batteries with the appropriate average capacity for each locale will be on charge at the charging stations.

The guide device pertaining to the sixth invention is the guide device pertaining to the second invention, wherein the first information includes information about the average capacity of the batteries being charged at each of the charging stations. The guide component, after equalization of the number of the batteries, guides a power consumption element so as to equalize the average capacity of the batteries at a plurality of charging stations.

This allows equalization of the number and equalization of the average capacity to be performed at a plurality of charging stations.

The guide device pertaining to the seventh invention is the guide device pertaining to the fourth invention, wherein the first information includes information about the average capacity of the batteries being charged at each of the charging stations. A target average capacity is set for each of the plurality of charging stations. The guide component guides a power consumption element so that after the number of the batteries being charged at each of the charging stations has fallen within a specific range of the target number, the average capacity of the batteries being charged at each of the charging stations falls within a specific range of the target average capacity.

Consequently, a power consumption element can be guided so as to approach the target number and the target average capacity set for each charging station, at a plurality of charging stations.

The guide device pertaining to the eighth invention is the guide device pertaining to the third invention, wherein the first information includes information about the number of the batteries being charged at each of the charging stations. The guide component, after equalization of the average capacity of the batteries, guides a power consumption element so as to equalize the number of the batteries at the plurality of charging stations.

Consequently, power consumption elements can be guided so as to approach the target number and the target average capacity set for each charging station, at a plurality of charging stations.

The guide device pertaining to the ninth invention is the guide device pertaining to the fifth invention, wherein the first information includes information about the number of the batteries being charged at each of the charging stations. A target number is set for each of the plurality of charging stations. The guide component guides a power consumption element so that after the average capacity of the batteries being charged at each of the charging stations has fallen within a specific range of the target average capacity, the number of the batteries being charged at each of the charging stations falls within a specific range of the target number.

The guide device pertaining to the tenth invention is the guide device pertaining to the second invention, wherein the second information includes information about the return number of the batteries that are returned to the charging station in each of the power consumption elements, and the rental number of the batteries that are rented out from the charging station. The guide component guides a power consumption element in which the return number is greater than the rental number to a charging station where the number of batteries being charged is at or under a first threshold value.

Consequently, the number of batteries at a charging station where the number of charged batteries has decreased can be increased.

The guide device pertaining to the eleventh invention is the guide device pertaining to the second invention, wherein the guide component guides a power consumption element to a charging station where the number of batteries being charged is at or over a second threshold value.

This allows a power consumption element to be guided to a charging station where more batteries are being charged.

The guide device pertaining to the twelfth invention is the guide device pertaining to the third invention, wherein the guide component does not guide a power consumption element to a charging station where the average capacity of the batteries being charged is at or under a third threshold value.

This allows the average capacity at a charging station where the average capacity is low to be increased while power consumption elements are not being guided there.

The guide device pertaining to the thirteenth invention is the guide device pertaining to the third invention, wherein the second information includes information about the remaining capacity in a power consumption element. The guide component guides a power consumption element in which the remaining capacity is at or over a sixth threshold value to a charging station where the average capacity of the batteries being charged is at or under a third threshold value.

This allows the average capacity to be increased at a charging station where the average capacity is low.

The guide device pertaining to the fourteenth invention is the guide device pertaining to the third invention, wherein the guide component guides a power consumption element to a charging station where the average capacity of the batteries being charged is at or over a fourth threshold value.

This allows a power consumption element to be guided to a charging station where the average capacity of the batteries being charged is high.

The guide device pertaining to the fifteenth invention is the guide device pertaining to the fourth invention, wherein the second information includes information about the return number of the batteries that are returned to the charging station in each of the power consumption elements, and the rental number of the batteries that are rented out from the charging station. A first threshold value that is lower than the target number is set for each of the plurality of charging stations. The guide component guides a power consumption element in which the return number is greater than the rental number to a charging station where the number of batteries being charged is at or under the first threshold value.

Consequently, the number of batteries can be increased at a charging station where the number of batteries being charged has decreased and the number of batteries being charged is at or under the first threshold value.

The guide device pertaining to the sixteenth invention is the guide device pertaining to the fourth invention, wherein a second threshold value that is higher than the target number is set for each of the plurality of charging stations. The guide component guides a power consumption element to a charging station where the number of batteries being charged is at or over the second threshold value.

Consequently, a power consumption element can be guided to a charging station where the number of batteries being charged has increased and the number of batteries being charged is at or over the second threshold value.

The guide device pertaining to the seventeenth invention is the guide device pertaining to the fifth invention, wherein a third threshold value that is under the target average capacity is set for each of the plurality of charging stations. The guide component does not guide a power consumption element to a charging station where the average capacity of the batteries being charged is at or under the third threshold value.

This allows the average capacity at a charging station where the average capacity is under the third threshold value to be increased while power consumption elements are not being guided there.

The guide device pertaining to the eighteenth invention is the guide device pertaining to the fifth invention, wherein the second information includes information about the remaining capacity in the power consumption element. A third threshold value that is under the target average capacity is set for each of a plurality of charging stations. The guide component guides a power consumption element in which the remaining capacity is at or over a sixth threshold value to a charging station where the average capacity of the batteries being charged is at or under a third threshold value.

The guide device pertaining to the nineteenth invention is the guide device pertaining to the fifth invention, wherein a fourth threshold value that is over the target average capacity is set for each of a plurality of charging stations. The guide component guides a power consumption element to a charging station where the average capacity of the batteries being charged is at or over the fourth threshold value.

Consequently, a power consumption element can be guided to a charging station where the average capacity of the batteries being charged has increased and the average capacity of the batteries being charged is at or over the fourth threshold value.

The guide device pertaining to the twentieth invention is the guide device pertaining to any of the first to eleventh, thirteenth to sixteenth, eighteenth, and nineteenth inventions, wherein the second information includes information about the remaining capacity in each of the power consumption elements. The guide component preferentially guides a power consumption element in which the remaining capacity is at or under a fifth threshold value.

Consequently, a power consumption element that needs to be charged can be preferentially guided (led) to a charging station where the number or average capacity of batteries is high.

The guide device pertaining to the twenty-first invention is the guide device pertaining to any of the first to eleventh, thirteenth to sixteenth, eighteenth, and nineteenth inventions, wherein the second information includes information about the number of batteries connected to each of the power consumption elements. The guide component guides the power consumption elements in order, starting from those with the most connected batteries.

Consequently, power consumption elements with higher numbers of batteries to be replaced can be preferentially guided (led) to charging stations where the number or average capacity of batteries is high.

The guide device pertaining to the twenty-second invention is the guide device pertaining to any of the first to eleventh, thirteenth to sixteenth, and eighteenth to twenty-first inventions, further comprising a location information acquisition component that acquires location information about the plurality of power consumption elements. The guide component guides a power consumption element that is within a specific range from a charging station.

This allows guidance to be performed for only those power consumption elements that are near a charging station.

The guide device pertaining to the twenty-third invention is the guide device pertaining to the first invention, wherein the power consumption element is an electric motorcycle, an electric bicycle, an electrically assisted bicycle, or an electric power tool.

This allows a moving body such as an electric motorcycle, an electric bicycle, or an electrically assisted bicycle to be guided to a specific charging station.

Also, a user who is using an electric drill or other such power tool can be guided to a specific charging station.

The guidance system according to the twenty-fourth invention comprises a first battery information acquisition component, a second battery information acquisition component, and a guide component. The first battery information acquisition component acquires first information related to batteries being charged at a charging station in which are installed one or more charging devices capable of charging a plurality of batteries. The second battery information acquisition component acquires second information related to the batteries respectively connected to a plurality of power consumption elements. The guide component guides a specific power consumption element to a specific charging station on the basis of the first information acquired by the first battery information acquisition component and the second information acquired by the second battery information acquisition component.

Thus acquiring information related to batteries being charged from a plurality of charging stations and acquiring information related to the batteries connected to a plurality of vehicles allows power consumption elements to be guided to a charging station on the basis of this information.

The guide method pertaining to the twenty-fifth invention comprises a first battery information acquisition step, a second battery information acquisition step, and a guide step. The first battery information acquisition step involves acquiring first information related to batteries being charged at a charging station in which are installed one or more charging devices capable of charging a plurality of batteries. The second battery information acquisition step involves acquiring second information related to the batteries respectively connected to a plurality of power consumption elements. The guide step involves guiding a specific power consumption element to a specific charging station on the basis of the first information acquired by the first battery information acquisition component and the second information acquired by the second battery information acquisition component.

Thus acquiring information related to batteries being charged from a plurality of charging stations and acquiring information related to the batteries connected to a plurality of vehicles allows power consumption elements to be guided to a charging station on the basis of this information.

Effects

With the guide device, guide system, and guide method of the present invention, a power consumption element can be guided to a charging station, for a plurality of power consumption elements and a plurality of charging stations.

BRIEF DESCRIPTION OF THE DRAWINGS

FIG. 7 is a diagram of a first threshold value and a second threshold value set in modification examples of Embodiments 1 and 3 of the present invention; and FIG. 8 is a diagram of a first threshold value and a second threshold value set in modification examples of Embodiments 2 and 3 of the present invention.

DETAILED DESCRIPTION

Figure 1:
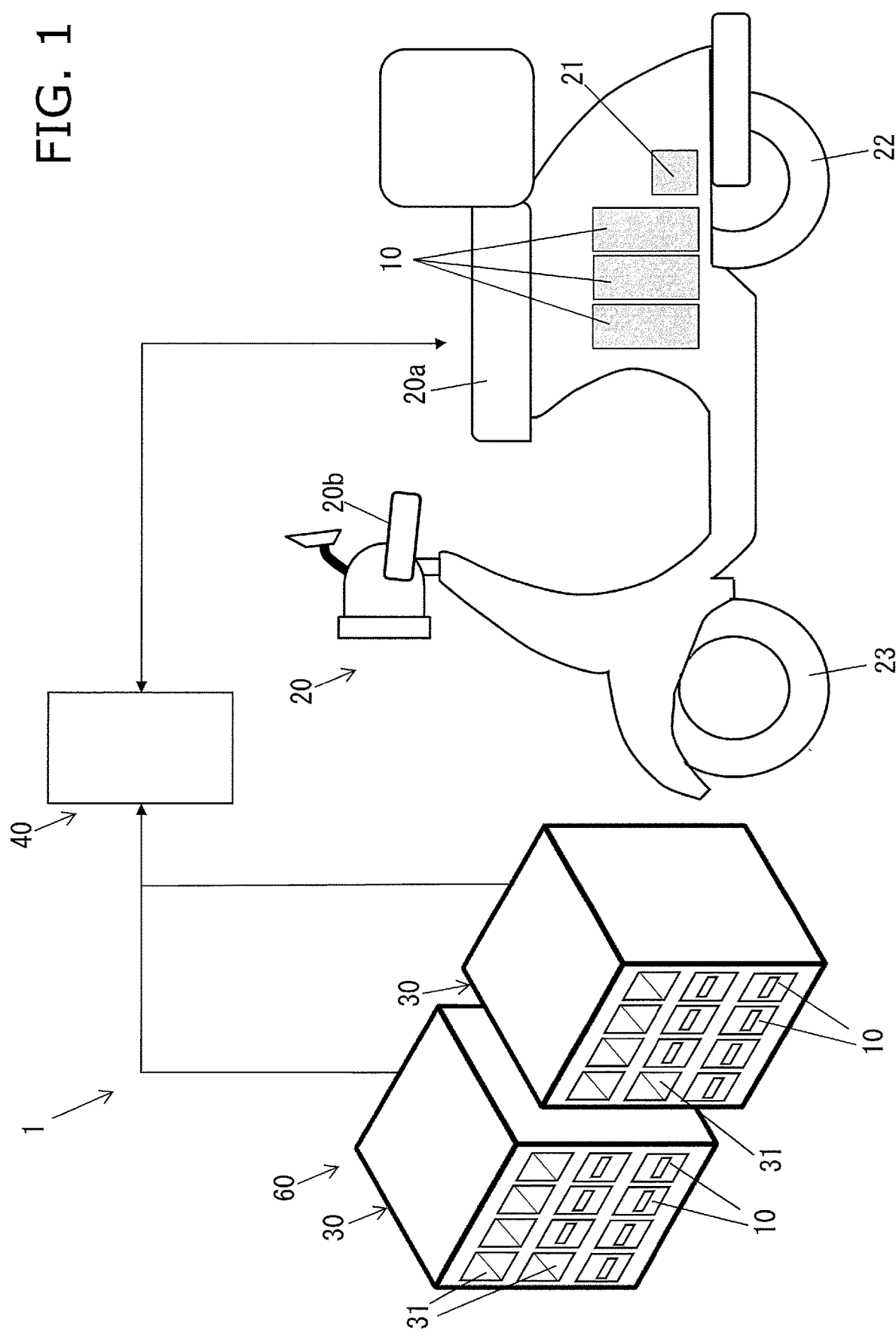
FIG. 1 is a diagram of the guide system in a first embodiment of the present invention.

The guide device, guide system, and guide method pertaining to an embodiment of the present invention will now be described through reference to the drawings.

Embodiment 1

1. Configuration 1-1. Overview of Guide System

The guide system 1 in this embodiment is a system that guides a vehicle 20 to one of a plurality of charging stations 60 for the purpose of exchanging the batteries 10 installed in the vehicle 20.

In the vehicle 20, power is supplied from three batteries 10 installed in a space below a seat 20a to a motor 21, and the rear wheel (drive wheel) 22 is rotationally driven, so that the vehicle can travel. The front wheel 23 is a steered wheel provided between the front part of the vehicle 20 and the road surface, and the travel direction can be varied by changing the orientation in conjunction with the orientation of a handle bar 20b.

The vehicle 20 can make use of what is known as a battery swap, in which the batteries 10 whose remaining capacity has been reduced by travel, natural discharge, or the like are replaced with charged batteries 10 at a specific charging station 60.

In order to supply power to the vehicle 20, three of the batteries 10 are installed in the vehicle 20 in a manner that allows them to be replaced. The three batteries 10 are connected in parallel to the vehicle 20. Therefore, even when only one of the three batteries 10 is installed in the vehicle 20, power can be supplied to the motor 21 and the vehicle 20 can travel.

The guide system 1 comprises a plurality of charging stations 60 and a guide device 40. The charging stations 60 each have one or more charging devices 30 to charge the batteries 10. The guide device 40 guides a specific vehicle 20 out of the plurality of vehicles 20 to a specific charging station 60 out of the plurality of charging stations 60.

1-2. Charging Station 60

The charging station 60 has one or more charging devices 30. Each charging device 30 has a plurality of rechargeable battery holes 31 into which the batteries 10 are inserted. The batteries 10 are accommodated in the rechargeable battery holes 31. The batteries 10 are charged while housed in these rechargeable battery holes 31. Although the charging station 60 shown in FIG. 1 is provided with two charging devices 30, the number is not limited to two, and may be one or three or more. Also, the charging devices 30 shown in FIG. 1 have the same number of rechargeable battery holes 31, but the number of rechargeable battery holes 31 may be different.

Figure 2:
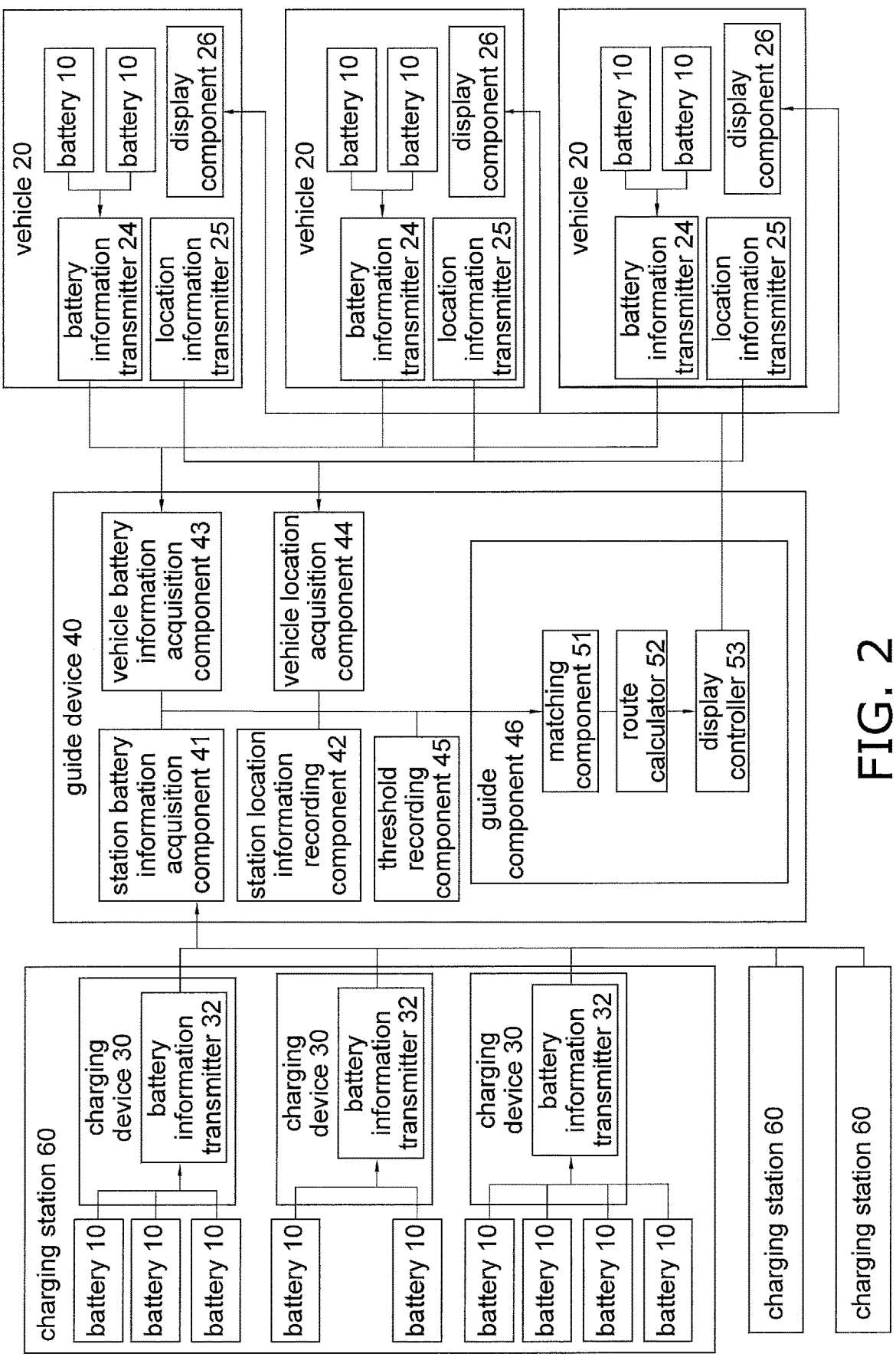
FIG. 2 is a block diagram of the configuration of the guide system in FIG. 1.

As shown in FIG. 2, each charging device 30 has a battery information transmitter 32. The battery information transmitter 32 transmits information related to the housed batteries 10 to the guide device 40. This information related to the batteries 10 stored in the charging device 30 is also referred to as station (St) battery information, and corresponds to an example of first information related to the batteries. The station battery information includes the number of batteries 10 housed in each charging device 30, the charge thereof, the average charge, and so forth. The number, the charge or average charge, etc., of the batteries 10 housed in each charging device 30 of each charging station 60 are transmitted to the guide device 40, and the station (St) battery information acquisition component 41 (discussed below) of the guide device 40 finds the number, the charge or average charge, etc., of the batteries 10 in each charging station 60. The number and average charge of the batteries 10 in the charging station 60 may be sent to the guide device 40 after this information is found from the number and charge of the batteries 10 in each charging device 30.

The charging stations 60 are installed at a plurality of locations, such as at gasoline stations.

In FIG. 2, three charging stations 60 are provided, but the number of batteries 10 that can be charged in the three charging stations 60 may be the same or different.

1-3. Vehicle 20

As shown in FIG. 2, the vehicle 20 has a battery information transmitter 24, a location information transmitter 25, and a display component 26.

The battery information transmitter 24 transmits information related to the batteries 10 of each vehicle 20 to the guide device 40. This information related to the batteries 10 of the vehicle 20 is also referred to as vehicle battery information, and corresponds to an example of second information related to batteries.

Here, the vehicle battery information includes the number of batteries 10 installed in the vehicle 20, the charge of each battery 10, the number of batteries 10 to be returned to the charging station 60, the number of batteries to be rented out from the charging station 60, and the like. The number of batteries 10 to be returned and the number of batteries 10 to be rented out may be inputted by the user, or may be automatically calculated from the remaining capacity of each battery 10. Furthermore, the user may input the scheduled travel distance, so that the number of the batteries 10 to be returned to the charging station 60 and the number of batteries 10 to be rented out are automatically calculated on the basis of the scheduled travel distance.

The location information transmitter 25 transmits the current location of the vehicle 20 to the guide device 40.

The display component 26 displays the guide information transmitted from the guide device 40. The guide information is information for guiding to a specific charging station 60.

1-4. Guide Device 40

The guide device 40 comprises the station battery information acquisition component 41, a station location information recording component 42, a vehicle battery information acquisition component 43, a vehicle location acquisition component 44, a threshold recording component 45, and a guide component 46.

The station battery information acquisition component 41 receives the station battery information transmitted from the battery information transmitter 32 for each of the charging devices 30 of a plurality of charging stations 60. Communication between the station battery information acquisition component 41 and the battery information transmitter 32 may be performed wirelessly or by wire, and may be via the Internet.

The station location information recording component 42 stores the respective locations of a plurality of charging stations 60.

The vehicle battery information acquisition component 43 receives the vehicle battery information transmitted from the battery information transmitter 24 of a plurality of vehicles 20. Communication between the vehicle battery information acquisition component 43 and the battery information transmitter 24 is performed wirelessly, and may be via the Internet.

The threshold recording component 45 records a first threshold value and a second threshold value for the number of batteries 10 being charged at a charging station 60 (this is also called the total number of batteries 10 housed in the charging devices 30 installed in a charging station 60), and a fifth threshold value for the remaining capacity of the vehicle 20.

The guide component 46 guides a specific vehicle 20 to a specific charging station 60. The guide component 46 has a matching component 51, a route calculator 52, and a display controller 53.

The matching component 51 matches a specific vehicle 20 with a specific charging station 60 on the basis of the station battery information, the location of the charging station 60, the vehicle battery information, and the location of the vehicle 20. The term "matching" as used here can also be said to mean deciding to guide a specific vehicle 20 to a specific charging station 60.

The route calculator 52 calculates a route leading a vehicle 20 to a charging station 60 from location information about the matched vehicle 20 and location information about the charging station 60.

The display controller 53 causes the display component 26 of a specific vehicle 20 to display guide information for guiding to a specific charging station 60, on the basis of the matching created by the matching component 51. Examples of guide information include a route to the matched charging station 60.

2. Operation

Next, the operation of the guide device 40 in this embodiment will be described, and an example of the guide method of the present invention will also be described at the same time.

In this embodiment the number of batteries 10 that can accommodate in the plurality of charging station 60 is the same. In this embodiment the guide device 40 guides the vehicle 20 to a charging station 60 so that the number of batteries in each charging station 60 will be equalized.

The term "equalization" as used here means that the number of batteries 10 housed in each of the plurality of charging stations 60 is set between a first threshold value and a second threshold value. The first threshold and the second threshold can be set to ±20% of the median of the equalization. For example, if the number of batteries 10 housed in each of the charging stations 60 is 25, and if we let the median (also called the target value) of the equalization be 20 batteries, the first threshold value can be set to 16, and the second threshold value to 24.

First, the guide device 40 acquires station battery information from each charging station 60 via the station battery information acquisition component 41 (step S11). In this embodiment, station battery information includes information about the number of batteries 10 housed in each charging station 60.

Next, the guide component 40 acquires vehicle battery information from each vehicle 20 via the vehicle battery information acquisition component 43 (step S12). In this embodiment, vehicle battery information includes information about the remaining capacity of the batteries 10 of each vehicle 20, the number installed, the return number of the batteries 10, and the rental number of the batteries 10.

Next, the guide device 40 acquires location information about each vehicle 20 via the vehicle location acquisition component 44 (step S13).

Then, the matching component 51 of the guide component 46 compares the number of batteries 10 included in the station battery information with the first threshold value recorded in the threshold recording component 45, and determines whether or not there is a charging station 60 where the number of housed batteries 10 is at or under the first threshold value (step S14).

If there is a charging station 60 where the number of housed batteries 10 is at or under a first threshold value, the matching component 51 matches any vehicles 20 in which the return number minus the rental number is greater than zero to any charging stations 60 where the number of housed batteries 10 is at or under the first threshold value (step S15).

Then, the matching component 51 of the guide component 46 compares the number of batteries 10 included in the station battery information with the second threshold value recorded in the threshold recording component 45, and determines whether or not there is a charging station 60 where the number of housed batteries 10 is at or over the second threshold value (step S16).

If there is a charging station 60 where the number of housed batteries 10 is at or over the second threshold value, the matching component 51 preferentially matches vehicles 20 in which the remaining capacity is at or under a fifth threshold value and the remainder of the rental number minus the return number is large to that charging station 60, on the basis of the vehicle battery information (step S18). An example of the fifth threshold value here is when the remaining capacity 500 wh or less. This fifth threshold value is recorded in the threshold recording component 45.

Next, the route calculator 52 of the guide component 46 calculates the route of the matched vehicle 20 to the charging station 60 from the location information about the matched charging station 60 that is recorded in the station location information recording component 42, and the location information about the matched vehicle 20. For example, the route of a vehicle 20 in which the return number minus the rental number is greater than zero to a charging station 60 at or under the first threshold value is calculated. Also, the route of a vehicle 20 in which the remaining capacity is at or under the fifth threshold value and the remainder of the rental number minus the return number is large to a charging station 60 at or over the second threshold value is calculated.

Next, the display controller 53 of the guide component 46 causes the display component 26 of the matched vehicle 20 to display the route to the matched charging station 60. Consequently, the vehicle 20 can be guided to the charging station 60 that was matched to that vehicle 20. That is, a vehicle 20 in which the return number minus the rental number is greater than zero can be guided to a charging station 60 where the number of housed batteries 10 is at or under the first threshold value, and a vehicle 20 in which the remaining capacity is at or under the fifth threshold value and the remainder of the return number minus the rental number is large can be guided to a charging station 60 wherein the number of housed batteries 10 is at or over the second threshold value.

In step S16, if there is no charging station 60 in which the number of housed batteries 10 is at or over the second threshold value, then only vehicles 20 in which the rental number minus the return number is greater than zero are guided to a charging station 60 where the number of housed batteries 10 is at or under the first threshold value.

Also, in step S14, if there is no charging station 60 in which the number of housed batteries 10 is at or under the first threshold value, control proceeds to step S17, and it is determined whether or not there is a charging station 60 in which the number of housed batteries 10 is at or over the second threshold value. If there is a charging station 60 in which the number of housed batteries 10 is at or over the second threshold value, steps S18, S19, and S20 are carried out, and only vehicles 20 in which the remaining capacity is at or under the fifth threshold value and the remainder of the rental number minus the return number is large are guided to a charging station 60 where the number of housed batteries 10 is at or over the second threshold value.

Also, in step S17, if there is no charging station 60 in which the number of housed batteries 10 is at or over the second threshold value, then the number of housed batteries in all of the charging stations 60 is between the first threshold value and the second threshold value, and the number of batteries 10 in all of the charging stations 60 has been equalized.

Embodiment 2

Next, the guide device 40 in Embodiment 2 of the present invention will be described. The guide device 40 of Embodiment 2 has the same basic configuration as Embodiment 1, the difference being the operation in matching.

Figure 4:
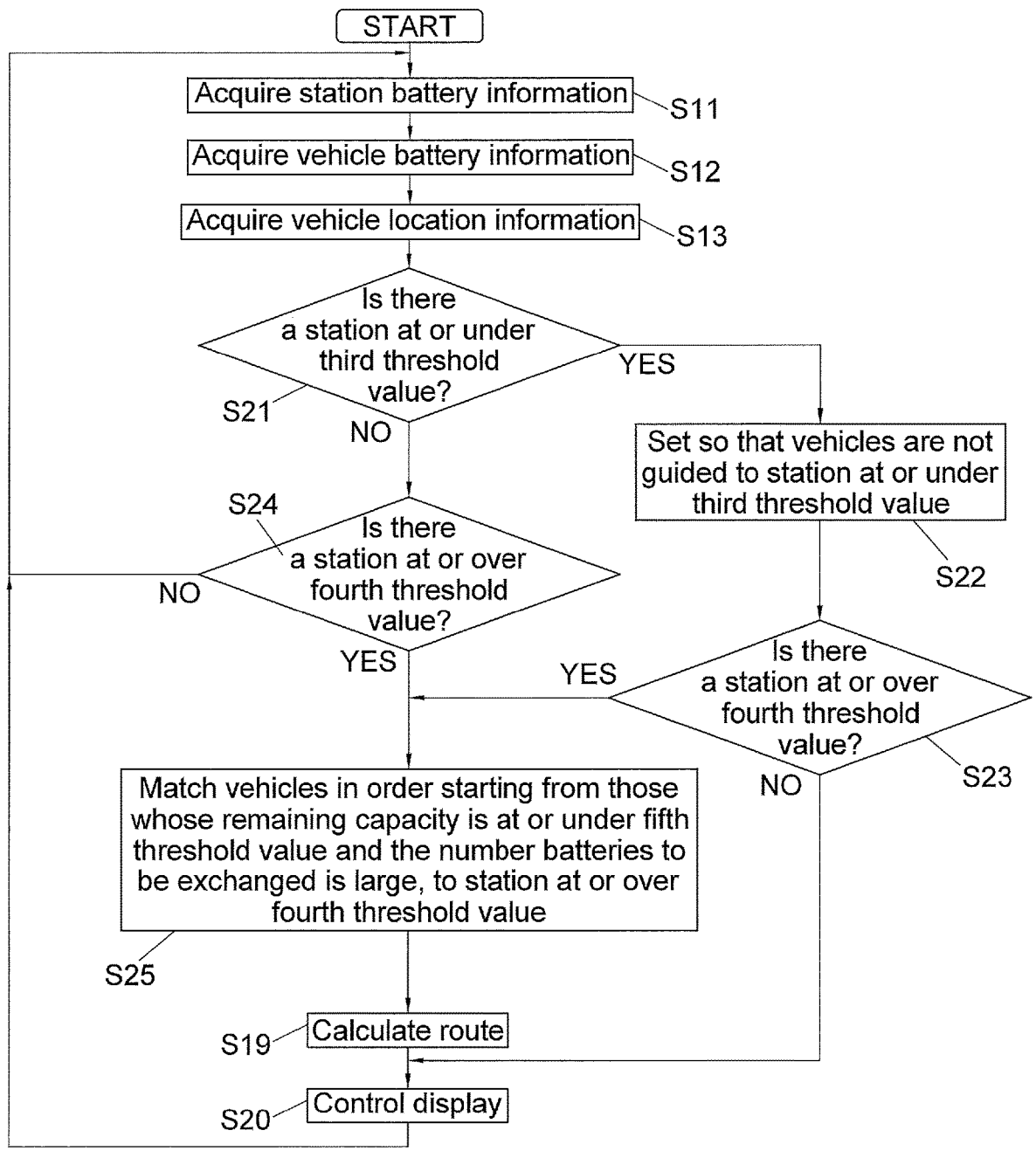
FIG. 4 is a flowchart of the operation of the guide device in Embodiment 2 of the present invention.

FIG. 4 is a flowchart of the operation of the guide device 40 in Embodiment 2. In Embodiment 2, vehicles 20 are guided to the charging stations 60 so as to equalize the average capacity of the batteries 10 housed at a plurality of charging stations 60. The term "equalization" as used here means that the average capacity of the batteries 10 housed in a plurality of charging stations 60 is between a third threshold value and a fourth threshold value. For example, if the full charge capacity of the batteries 10 housed by each charging station 60 is 2000 wh, the third threshold value can be set to 500 wh and the fourth threshold value to 1400 wh. Therefore, the threshold recording component 45 in Embodiment 2 records the third threshold value and the fourth threshold value for the average capacity at the charging stations 60, and a fifth threshold value for the remaining capacity of the vehicles 20.

First, the guide device 40 acquires station battery information from each charging station 60 via the station battery information acquisition component 41 (step S11). In this embodiment, station battery information includes information about the average capacity of the batteries 10 housed in each charging station 60.

Next, the guide component 40 acquires vehicle battery information from each vehicle 20 via the vehicle battery information acquisition component 43 (step S12). In this embodiment, vehicle battery information includes information about the remaining capacity of the batteries 10 of each vehicle 20, and the number installed.

Next, the guide device 40 acquires location information about each vehicle 20 via the vehicle location acquisition component 44 (step S13).

Then, the matching component 51 of the guide component 46 compares the average capacity of the batteries 10 included in the station battery information with the third threshold value recorded in the threshold recording component 45, and determines whether or not there is a charging station 60 where the average capacity of the housed batteries 10 is at or under the third threshold value (step S21).

If there is a charging station 60 where the average capacity of the housed batteries 10 is at or under the third threshold value, the matching component 51 is set so that vehicles 20 will not be guided to that charging station 60 (step S22).

Figure 5:
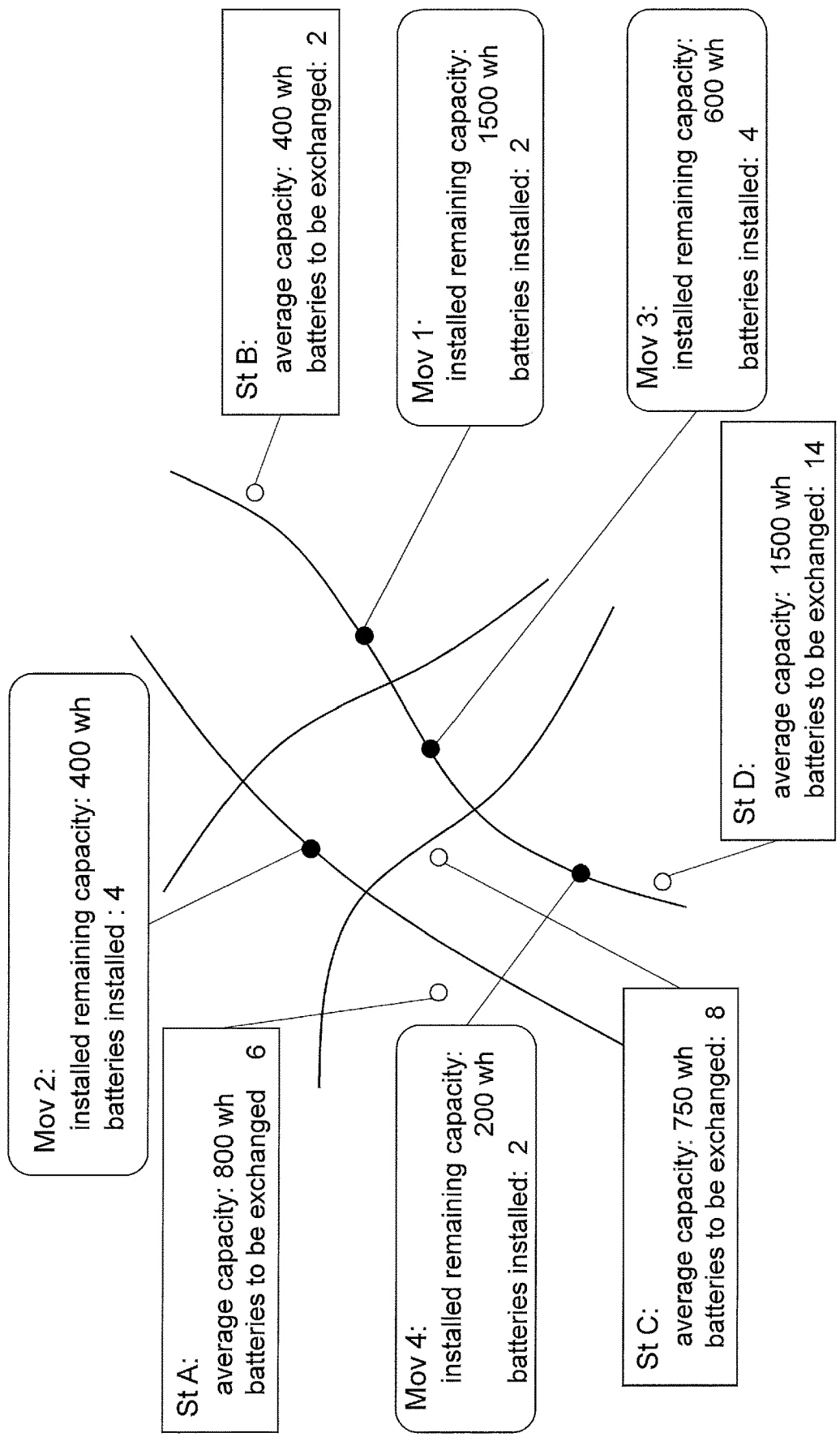
FIG. 5 is a diagram of the state of a charging device and the state of a vehicle in Embodiment 2 of the present invention.

FIG. 5 is a diagram of an example in which a plurality of charging stations 60 are disposed. In FIG. 5, a plurality of charging stations 60 (StA, StB, StC, and StD are shown) are set up within a specific region, and there are a plurality of vehicles 20 (Mov1, Mov2, Mov3, and Mov4 are shown) are located within a specific region. Then, it is determined in step S22 that StB corresponds to a charging station 60 where the average capacity of the housed batteries 10 is at or under the third threshold value, and the acceptance of battery exchange at StB is temporarily halted.

Since the batteries 10 housed in the charging stations 60 are being charged over time, the average capacity rises above the third threshold value as time passes without any vehicles 20 being accepted.

Next, the matching component 51 of the guide component 46 compares the average capacity of the batteries 10 included in the station battery information with the fourth threshold value recorded in the threshold recording component 45, and determines whether or not there is a charging station 60 where the average capacity of the housed batteries 10 is at or over the fourth threshold value (step S23).

If there is a charging station 60 where the average capacity of the housed batteries 10 is at or over the fourth threshold value, the matching component 51 preferentially matches vehicles 20 to that charging station 60. Here, on the vehicle 20 side, the matching component 51 preferentially matches vehicles 20 whose remaining capacity is below the fifth threshold value and which have a large number of replacements, on the basis of vehicle battery information, with a charging station 60 (step S25).

In the example in FIG. 5, StD is a charging station 60 where the average capacity of the housed batteries 10 is at or over the fourth threshold value. Also, if we let the fifth threshold value be 500 Wh, for example, the vehicles 20 with a capacity of less than 500 Wh are Mov2 and Mov4. A vehicle 20 with a large number of batteries installed is Mov2, so it is surmised that number of replacements is also large. Therefore, Mov2 and Mov4 are guided in that order to StD. Thus, the number of installed batteries included in the vehicle battery information can be used as an indicator of the number of replacements.

Next, the route calculator 52 of the guide component 46 calculates the route of a matched vehicle 20 to a charging station 60 from location information about a matched charging station 60 recorded in the station location information recording component 42 and location information about a matched vehicle 20 (step S19). The route of a vehicle 20 whose remaining capacity is at or under the fifth threshold value and which has a large number of replacements to a charging station 60 where the average capacity of the housed batteries 10 is at or over the fourth threshold value is calculated. For example, in the example in FIG. 5, the route leading Mov2 to StD is calculated.

Next, the display controller 53 of the guide component 46 causes the display component 26 of a matched vehicle 20 to display the route to a matched charging station 60 (step S20). In the example in FIG. 5, the display controller 53 causes the display component 26 of Mov2 to display the route to StD.

Consequently, a vehicle 20 can be guided to the charging station 60 that has been matched to that vehicle 20. Specifically, a vehicle 20 whose remaining capacity is at or under the fifth threshold value and which has a large exchange number can be guided to a charging station 60 where the average capacity of the housed batteries 10 is at or over the fourth threshold value. Also, the display controller 53 causes the display components 26 of all the vehicles 20 to display a message to the effect that charging stations 60 where the average capacity of the housed batteries 10 is at or under the third threshold value are no longer being accepted. Also, no particular setting is performed for charging stations 60 where the average capacity is above the third threshold value and below the fourth threshold value (In FIG. 5, StA and StB).

On the other hand, in step S23, if there is no charging station 60 where the average capacity of the housed batteries 10 is at or over the fourth threshold value, in step S20 the display controller 53 causes the display components 26 of the vehicles 20 to display that they will not be directed to charging stations 60 where the average capacity of the housed batteries 10 is at or under the third threshold value, and will instead be directed to another charging station 60.

Also, in step S21, if there is no charging station 60 where the average capacity of the housed batteries 10 is at or under the third threshold value, control proceeds to step S24, and it is determined whether or not there is a charging station 60 where the average capacity of the housed batteries 10 is at or over the fourth threshold value. If there is a charging station 60 where the average capacity of the housed batteries 10 is at or over the fourth threshold value, steps S25, S19, and S20 are carried out, and vehicles 20 whose remaining capacity is at or under the fifth threshold value and which have a large exchange number are guided only to charging stations 60 where the average capacity of the housed batteries 10 is at or over the fourth threshold value.

Also, in step S24, if there is no charging station 60 where the average capacity of the housed batteries 10 is at or over the fourth threshold value, then the average capacity of the batteries housed in all of the charging stations 60 is between the third threshold value and the fourth threshold value, which means that the average capacity has been equalized at all of the charging stations 60.

FIG. 5 also shows the number of exchanges that can be made at each charging station 60, but the configuration may be such that when a vehicle 20 and a charging station 60 are matched in step S25, matching is done only for charging stations 60 where the possible exchange number is greater than the number of batteries installed in a vehicle 20.

Also, in Embodiment 1, a vehicle 20 whose remaining capacity was at or under the fifth threshold value and which had a large return number was preferentially guided to a specific charging station 60, but a vehicle 20 whose remaining capacity is at or under the fifth threshold value and which has a large exchange number may also be preferentially guided to a specific charging station 60 as in Embodiment 2 here. This exchange number can be surmised to increase in proportion to the number of batteries 10 installed in a vehicle 20, so the installation number included in the vehicle battery information may also be used as an index of the exchange number.

Embodiment 3

The guide device 40 in Embodiment 3 of the present invention will now be described. The guide device 40 in Embodiment 3 has the same basic configuration as Embodiments 1 and 2, the difference being the operation in matching.

Figure 6:
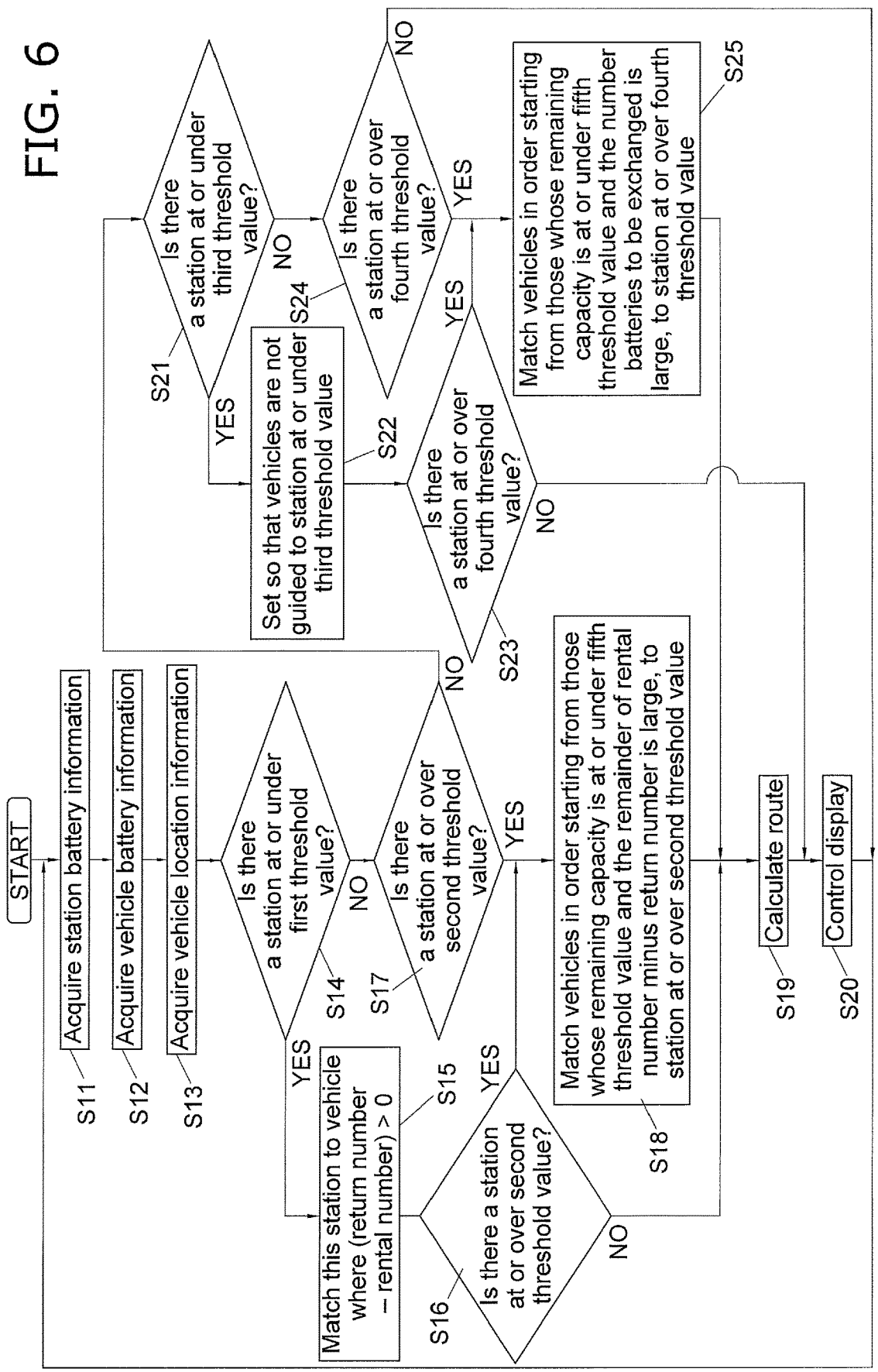
FIG. 6 is a flowchart of the operation of the guide device in Embodiment 3 of the present invention.

FIG. 6 is a flowchart of the operation of the guide system 40 in Embodiment 3. In Embodiment 3, the number of batteries 10 that can accommodate the plurality of charging stations 60 is the same. In the Embodiment 3 vehicles 20 are guided to charging stations 60 so that the average capacity of the batteries 10 housed in the charging stations 60 will be equalized for a plurality of charging stations 60 after equalizing the number of batteries in each charging station 60. That is, with the guide device 40 in Embodiment 3, the equalization operation of Embodiment 2 is performed after equalization by the operation in Embodiment 1.

Therefore, the threshold value recording component 45 in Embodiment 3 records a first threshold value and a second threshold value for the number of batteries 10 in a charging station 60, a third threshold value and a fourth threshold value for the average capacity at a charging station 60, and a fifth threshold value for the remaining capacity of a vehicle 20.

In Embodiment 3, steps S11 to S20 described in Embodiment 1 are provided, and in step S17, if there is no charging station 60 where the number of the housed batteries 10 is at or over the second threshold value, control proceeds to step S21 described in Embodiment 2, and steps S21 to S25 described in Embodiment 2 are performed.

Specifically, in step S17, if there is no charging station 60 where the number of the housed batteries 10 is at or over the second threshold value, this means that in the previous step S14 there is no charging station 60 where the number of the housed batteries 10 is at or under the first threshold value, so the equalization of the number of the batteries 10 is complete. Then, the equalization of the average capacity of the batteries is performed in steps S21 to S25, S19, and S20.

3. Key Features, etc (3-1)

The guide device 40 in Embodiments 1 to 3 comprises the station battery information acquisition component 41 (an example of a first battery information acquisition component), the vehicle battery information acquisition component 43 (an example of a second battery information acquisition component), and the guide component 46. The station battery information acquisition component 41 acquires station battery information (an example of first information) about the batteries 10 being charged at a charging station 60 in which are installed one or more charging devices 30 capable of charging a plurality of batteries 10. The vehicle battery information acquisition component 43 acquires vehicle battery information (an example of second information) about the batteries 10 connected to a plurality of vehicles 20 (an example of a power consumption element). The guide component 46 guides a specific vehicle 20 to a specific charging station 60 on the basis of the station battery information acquired by the station battery information acquisition component 41 and the vehicle battery information acquired by the vehicle battery information acquisition component 43.

Thus acquiring information related to the batteries 10 being charged at a plurality of charging stations 60 and acquiring information related to the batteries 10 connected to a plurality of vehicles 20 allows vehicles 20 to be guided to charging stations 60 on the basis of this information. This avoids a concentration of load at a specific charging station, for example.

(3-2)

With the guide device 40 in Embodiments 1 and 3, the station battery information includes information about the number of batteries 10 being charged at each charging station 60. The guide component 46 guides a vehicle 20 so as to equalize the number of batteries 10 at a plurality of charging stations 60.

This allows the number of batteries 10 at a plurality of charging stations 60 to be equalized, and avoids a concentration of load at a specific charging station 60.

(3-3)

With the guide device 40 in Embodiments 2 and 3, the station battery information includes information about average capacity of the batteries 10 being charged at each charging station 60. The guide component 46 guides a vehicle 20 so as to equalize the average capacity of the batteries 10 at a plurality of charging stations 60.

This allows the average capacity of the batteries 10 at a plurality of charging stations 60 to be equalized, and avoids a concentration of load at a specific charging station 60.

(3-4)

With the guide device 40 in Embodiment 3, the station battery information includes information about the number of batteries 10 being charged at each charging station 60, and information about the average capacity of the batteries 10 being charged at each charging station 60. The guide component 46 guides a vehicle 20 so as to equalize the average capacity of the batteries 10 at a plurality of charging stations 60 after the equalization of the number of batteries 10.

This allows the equalization of the number of batteries and the equalization of their average capacity to be performed for a plurality of charging stations 60.

(3-5)

With the guide device 40 in Embodiments 1 and 3, the vehicle battery information includes information about rental number of the batteries 10 rented out from charging stations 60 and the return number of the batteries 10 returned to the charging stations 60 for each of the vehicles 20. The guide component 46 guides vehicles 20 whose return number is greater than the rental number to charging stations 60 where the number of batteries 10 being charged is at or under the first threshold value.

This allows the number of batteries 10 at a charging station 60 where the number of batteries 10 being charged is low to be increased.

(3-6)

With the guide device 40 in Embodiment 1 and 3, the guide component 46 guides a vehicle 20 to a charging station 60 where the number of batteries 10 being charged is at or over the second threshold value.

This allows vehicles 20 to be guided to charging stations 60 where the number of batteries 10 being charged is large.

(3-7)

With the guide device 40 in Embodiment 2 and 3, the guide component 46 does not guide a vehicle 20 to a charging station 60 where the average capacity of the batteries 10 being charged is at or under the third threshold value.

This allows the average capacity at a charging station where the average capacity is low to be increased while vehicles 20 are not being guided there.

(3-8)

With the guide device 40 in Embodiments 2 and 3, the guide component 46 guides a vehicle 20 to a charging station 60 where the average capacity of the batteries 10 being charged is at or over the fourth threshold value.

This allows vehicles 20 to be guided to charging stations 60 where the average capacity of the batteries 10 being charged is high.

(3-9)

With the guide device 40 in Embodiments 1 to 3, the vehicle battery information includes information about the remaining capacity in each of the vehicles 20. The guide component 46 preferentially guides vehicles 20 whose remaining capacity is at or under the fifth threshold value.

This allows vehicles 20 that need charging to be preferentially guided (led) to a charging station 60 where the number or average capacity of the batteries 10 are high.

(3-10)

With the guide device 40 in Embodiments 1 to 3, the vehicle battery information includes information about the number of batteries 10 connected to each of the vehicles 20.

The guide component 46 guides the vehicles 20 in order starting from those in which more batteries 10 are connected.

This allows vehicles 20 in which a large number of batteries 10 will be exchanged to be preferentially guided (led) to a charging station 60 where the number or average capacity of the batteries 10 is high.

(3-11)

The guide system 1 pertaining to Embodiments 1 to 3 comprises the station battery information acquisition component 41, the vehicle battery information acquisition component 43, and the guide component 46. The station battery information acquisition component 41 acquires station battery information related to the batteries 10 being charged at a charging station 60 in which are installed one or more of the charging devices 30 that are capable of charging a plurality of the batteries 10. The vehicle battery information acquisition component 43 acquires vehicle battery information related to the batteries 10 connected to each of a plurality of vehicles 20. The guide component 46 guides a specific vehicle 20 to a charging station 60 on the basis of the station battery information acquired by the station battery information acquisition component 41 and the vehicle battery information acquired by the vehicle battery information acquisition component 43.

Thus acquiring information related to the batteries 10 being charged at a plurality of charging stations 60 and acquiring information related to the batteries 10 connected to a plurality of vehicles 20 allows vehicles 20 to be guided to charging stations 60 on the basis of this information.

(3-12)

The guide method pertaining to Embodiments 1 to 3 comprises step S11 (an example of a first battery information acquisition step), step S12 (an example of a second battery information acquisition step), steps S14 to S20, steps S21 to S25, and steps S19 and S20 (an example of guide steps). Step S11 (an example of a first battery information acquisition step) involves acquiring station battery information related to the batteries 10 being charged at a charging station 60 in which are installed one or more charging devices 30 capable of charging a plurality of batteries 10. Step S12 (an example of a second battery information acquisition step) involves acquiring vehicle battery information related to the batteries 10 connected to each of a plurality of vehicles 20. Steps S14-S20, steps S21 to S25, and steps S19 and S20 (an example of guide steps) involve guiding a specific vehicle 20 to a specific charging device on the basis of the station battery information acquired in step S11 (an example of a first battery information acquisition step) and the vehicle battery information acquired in step S12 (an example of a second battery information acquisition step).

Thus acquiring information related to the batteries 10 being charged at a plurality of charging stations 60 and acquiring information related to the batteries 10 connected to a plurality of vehicles 20 allows the vehicles 20 to be guided to the charging stations 60 on the basis of this information.

4. Other Embodiments

Embodiments of the present invention were described above, but the present invention is not limited to the above embodiments, and various modifications are possible without departing from the gist of the invention.

(A)

In Embodiments 1 and 3 above, the numbers of batteries 10 that could be housed at a plurality of charging stations 60 was the same, but the numbers of batteries 10 that can be housed at a plurality of charging stations 60 may be different.

In this case, a first threshold value and a second threshold value are preferably provided for each charging station 60. As shown in FIG. 7, the number that can be housed at StA (a charging station 60) is set to 140, and the number that can be housed at StB is set to 28. For example, StA is set up in an urban center, and StB is set up in the suburbs. It is reasonable to assume that more vehicles 20 will come in to a charging station 60 set up in an urban center, which is why the battery housing capacity is set larger. Also, it is reasonable to assume that fewer vehicles 20 will come in to a charging station 60 set up in the suburbs away from the city center, so the housing capacity is set smaller.

In this case, the target number at the StA is set to 100, the first threshold value is set to 80, and the second threshold value is set to 120. The target number at the StB is set to 20, the first threshold value is set to 16, and the second threshold value is set to 24.

Figure 3:
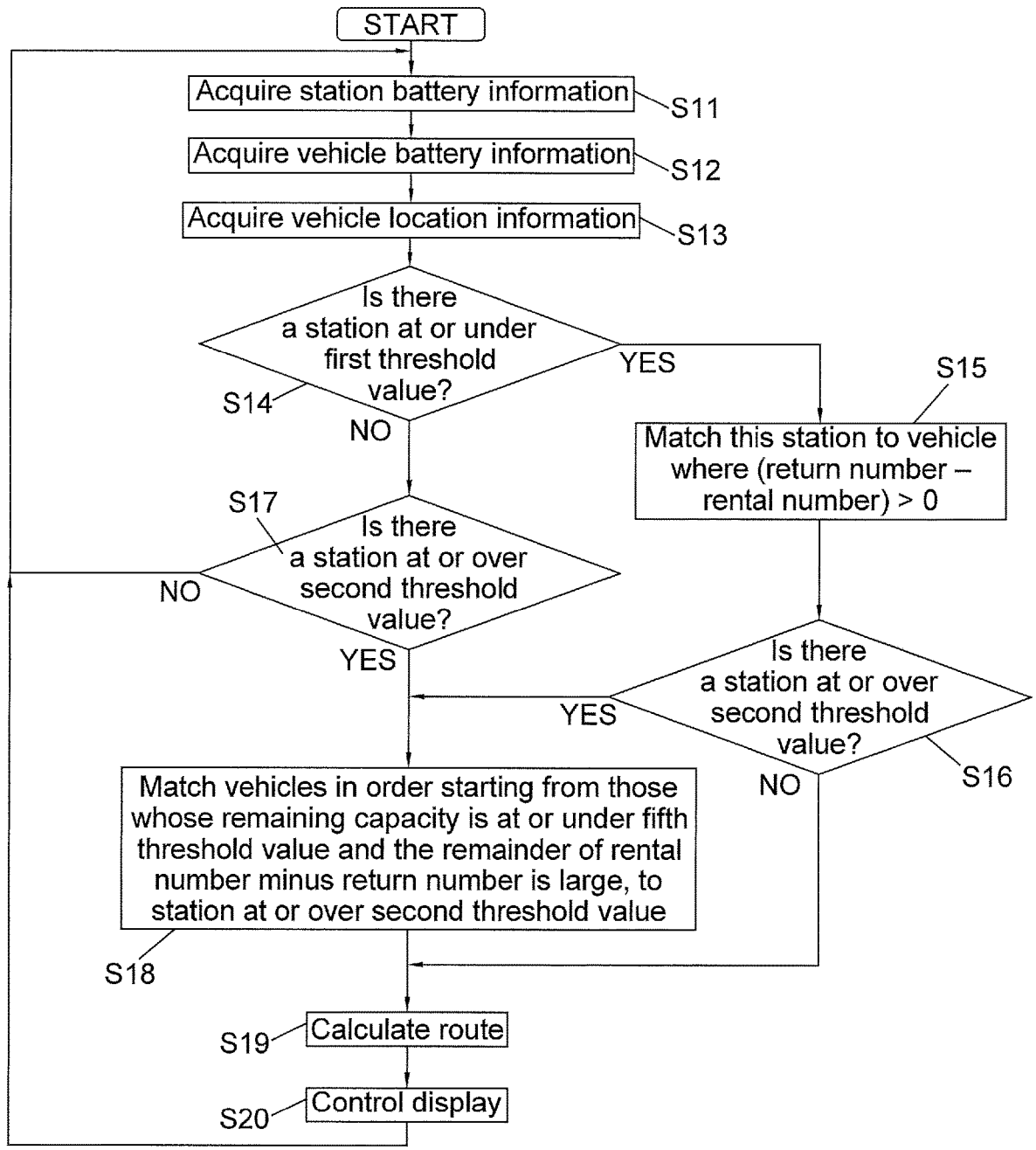
FIG. 3 is a flowchart of the operation of the guide device of FIG. 2.

The operation of the guide apparatus 40 in this case is the same as in the flowchart shown in FIG. 3, the threshold value recording component 45 records the first threshold value and second threshold value for each charging station 60, and determination is carried out in steps S14, S16, and S17.

(B)

In Embodiments 2 and 3 above, the third threshold value and the fourth threshold value for the average capacity of the batteries 10 housed in a plurality of charging stations 60 were set to the same value, but may instead be set to a different value for each charging station 60. In FIG. 8, the target average capacity at StA is set to 1000 wh, the third threshold value is set to 800 wh, and the fourth threshold value is set to 1200 wh. The target average capacity at StB is set to 1200 wh, the third threshold value is set to 1400 wh, and the fourth threshold value is set to 1600 wh. Here, StA is, for example, set up in an urban center, and StB is set up in the suburbs. In an urban center, because the movement distance is generally shorter, so the target average capacity is set lower, but in the suburbs the movement distance is generally longer, so the target average capacity is set higher.

The operation of the guide device 40 in this case is the same as in the flowchart shown in FIG. 4, the threshold value recording component 45 records the third threshold value and the fourth threshold value for each charging station 60, and determination is carried out in steps S21, S23, and S24.

(C)

In Embodiments 1 to 3 above, when matching of the vehicles 20 and the charging stations 60 is performed in steps S15, S18, and S25, the distance of the vehicle 20 from the charging station 60 is not taken into account, but vehicles 20 located within a specific radius of a charging station 60 that is preferentially guided to may be subjected to matching, and vehicles 20 outside this radius may be excluded from matching.

Also, in steps S15 and S18 in Embodiments 1 and 3 above, vehicles 20 having the same remainder of the return number minus the rental number may be matched on the basis of their distance from a charging station 60. Basing the matching on distance means matching the closest vehicle 20 to a charging station 60 at or under the first threshold value or a charging station 60 at or over the second threshold value, for example.

Furthermore, in step S25 in Embodiments 2 and 3 above, vehicles 20 having the same remaining capacity may be matched on the basis of their distance from a charging station 60. Basing the matching on distance means matching the closest vehicle 20 to a charging station 60 at or over the fourth threshold value, for example.

(D)

In Embodiments 1 to 3 above, guide information to a specific charging station 60 was displayed on the display component 26 of the vehicle 20, but the guide information may be conveyed by a speaker instead.

(E)

In Embodiments 1 to 3 above, in the display control in step S20, the route to a matched charging station 60 was displayed, but the time it will take to reach the matched charging station 60 and the time it will take for battery exchange may be displayed.

(F)

In Embodiments 3 above, the average capacity of the batteries 10 was equalized at a plurality of charging stations 60 after the equalization of the number of batteries 10, but the equalization of the number may be performed after the equalization of the average capacity.

Also, just as in the modification examples described in (A) and (B) above, when the control of (A) above and the control of (B) above continue to be performed, the control of (B) above may be performed after the control of (A) above, or the control of (A) above may be performed after the control of (B) above.

(G)

In Embodiments 2 and 3 above, vehicles 20 were not guided to a charging station 60 where the average capacity was at or under the third threshold value in step S22, but this is not the only option. For example, if a vehicle 20 having an average capacity that is at or over a sixth threshold value that is over the third threshold value returns its batteries 10, this vehicle 20 may be matched to a charging station 60 where the average capacity is at or under the third threshold value.

(H)

In Embodiments 1 to 3 above, the route to a matched charging station 60 was displayed on the display component 26 of the vehicle 20, but just the name or address of the charging station 60 may be displayed instead.

(I)

Also, the display is not limited to the display component 26 of the vehicle 20, and may instead be on an information terminal, such as a portable telephone or a smart phone, belonging to the user of the vehicle 20.

(J)

In the above embodiments, three batteries 10 were provided, but the number is not limited to three, and may be less than three or more than three.

(K)

In the above embodiments, an electric motorcycle was described as the power consumption element, for example, but it may be an electric bicycle, an electric unicycle, an electric automobile (EV), an electrically assisted bicycle, a PHV (plug-in hybrid vehicle), or some other such vehicle. The power consumption element may also be a drill or another such electric power tool, for example.

INDUSTRIAL APPLICABILITY

The guide device, the guide system, and the guide method of the present invention allow a power consumption element to be guided to a charging device, for a plurality of power consumption elements and a plurality of charging devices, and can be widely applied as a guide device, etc., used when using a vehicle that is driven by replaceable batteries.

REFERENCE SIGNS LIST

1: guide system
10: battery
20: vehicle
20a: seat
20b: handle bar
21: motor
23: front wheel
24: battery information transmitter
25: location information transmitter
26: display component
30: charging device
31: rechargeable battery hole
32: battery information transmitter
40: guide device
41: station battery information acquisition component
42: station location information recording component
43: vehicle battery information acquisition component
44: vehicle location acquisition component
45: threshold recording component
46: guide component
51: matching component
52: route calculator
53: display controller
60: charging station

The invention claimed is:

1. A guide device, comprising:
a first battery information acquisition component configured to acquire first information related to a plurality of batteries being charged at a charging station in which are installed one or more charging devices configured to charge the batteries;
a second battery information acquisition component configured to acquire second information related to batteries respectively connected to a plurality of power consumption elements; and
a guide component configured to guide a specific power consumption element to a specific charging station on the basis of the first information acquired by the first battery information acquisition component and the second information acquired by the second battery information acquisition component, wherein
the first information includes information about average capacity of the batteries being charged at the charging station, and
the guide component guides the power consumption elements so as to equalize the average capacity of the batteries at a plurality of the charging stations.

2. The guide device according to claim 1,
wherein the first information includes information about number of the batteries being charged at each of the charging stations, and
the guide component, after equalization of the average capacity of the batteries, guides the power consumption element so as to equalize the number of the batteries at the plurality of charging stations.

3. The guide device according to claim 1,
wherein the guide component does not guide the power consumption element to a charging station where the average capacity of the batteries being charged is at or under a third threshold value.

4. The guide device according to claim 1,
wherein the second information includes information about remaining capacity in the power consumption element, and
the guide component guides a power consumption element in which the remaining capacity is at or over a sixth threshold value to a charging station where the average capacity of the batteries being charged is at or under a third threshold value.

5. The guide device according to claim 1,
wherein the guide component guides the power consumption element to a charging station where the average capacity of the batteries being charged is at or over a fourth threshold value.

6. The guide device according to claim 1,
wherein the second information includes information about the remaining capacity in each of the power consumption elements, and
the guide component preferentially guides a power consumption element in which the remaining capacity is at or under a fifth threshold value.

7. The guide device according to claim 1,
wherein the second information includes information about number of batteries connected to each of the power consumption elements, and
the guide component guides the power consumption elements in order, starting from those with the most connected batteries.

8. The guide device according to claim 1,
further comprising a location information acquisition component configured to acquire location information about the plurality of power consumption elements,
wherein the guide component guides a power consumption element that is within a specific range from a charging station.

9. The guide device according to claim 1,
wherein the power consumption element is an electric motorcycle, an electric bicycle, an electrically assisted bicycle, or an electric power tool.

10. A guide system, comprising:
a first battery information acquisition component configured to acquire first information related to batteries being charged at a plurality of charging station in which are installed one or more charging devices configured to charge a plurality of batteries;
a second battery information acquisition component configured to acquire second information related to the batteries respectively connected to a plurality of power consumption elements; and
a guide component configured to guide a specific power consumption element to a specific charging station on the basis of the first information acquired by the first battery information acquisition component and the second information acquired by the second battery information acquisition component, wherein the first information includes information about average capacity of the batteries being charged at the charging station, and the guide component guides the power consumption elements so as to equalize the average capacity of the batteries at a plurality of the charging stations.

11. A guide method, comprising:

a first battery information acquisition step of acquiring first information related to batteries being charged at a charging station in which are installed one or more charging devices configured to charge a plurality of batteries, the first information including information about average capacity of the batteries being charged at the charging station;

a second battery information acquisition step of acquiring second information related to the batteries respectively connected to a plurality of power consumption elements; and a guide step of guiding a specific power consumption element to a specific charging station on the basis of the first information acquired by the first battery information acquisition component and the second information acquired by the second battery information acquisition component, wherein the guide step comprises guiding the power consumption elements so as to equalize the average capacity of the batteries at a plurality of the charging stations.

\* \* \* \* \*